Jan. 9, 1923.
G. GESSEL.
CARRIER FRAME FOR TIRES, TOOL BOXES, AND LICENSE NUMBER PLATES.
FILED JULY 23, 1921.
1,441,795.
2 SHEETS—SHEET 1.
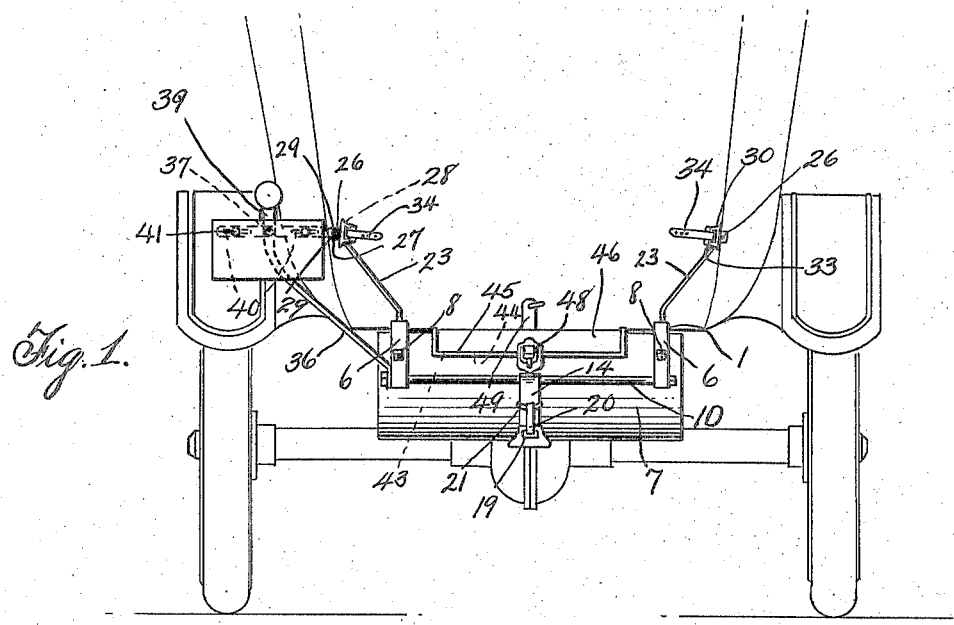
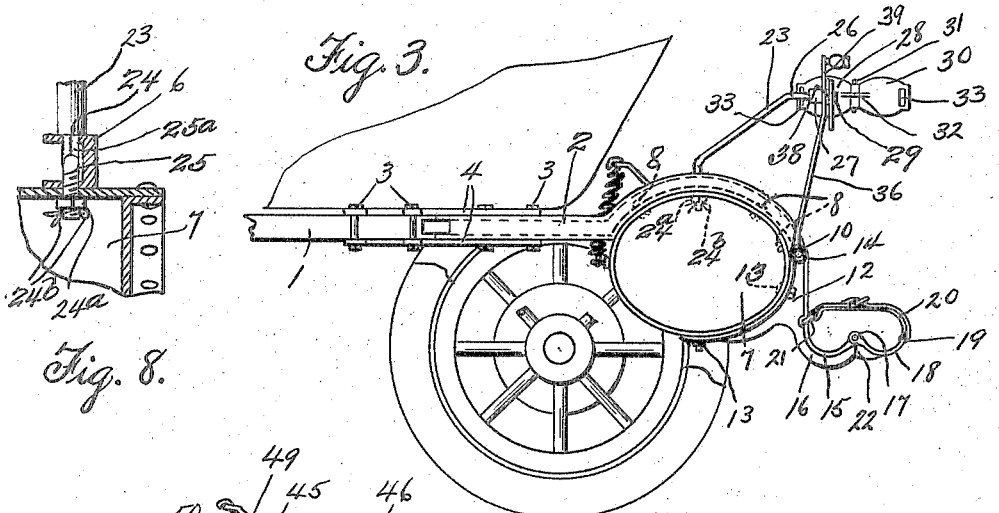
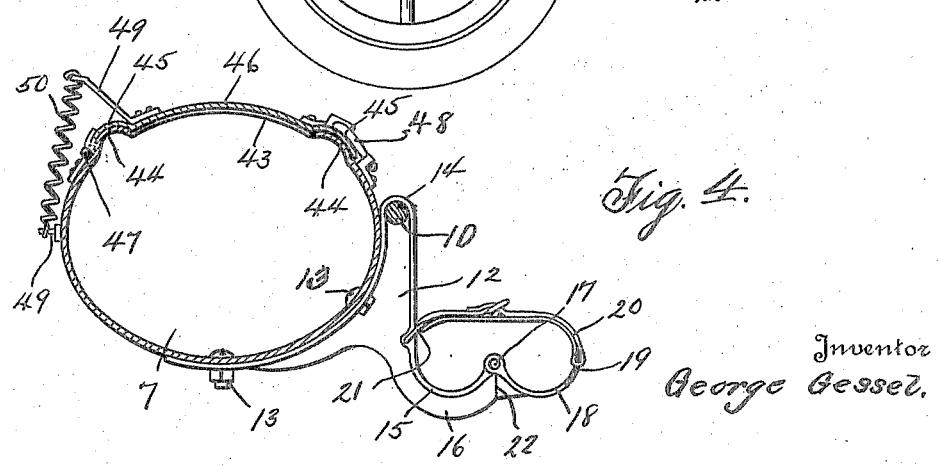

Jan. 9, 1923.
G. GESSEL.
CARRIER FRAME FOR TIRES, TOOL BOXES, AND LICENSE NUMBER PLATES.
FILED JULY 23, 1921.
1,441,795.
2 SHEETS—SHEET 2.
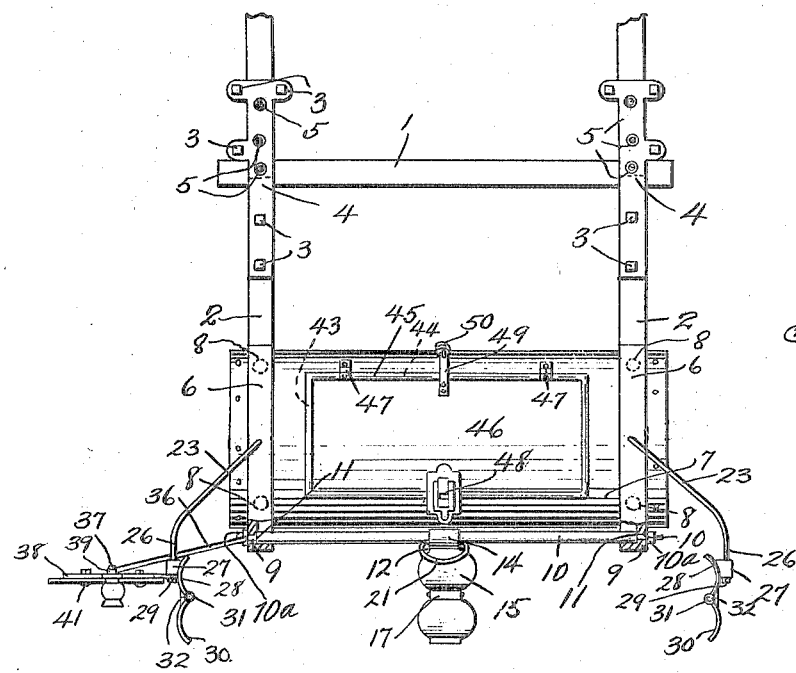
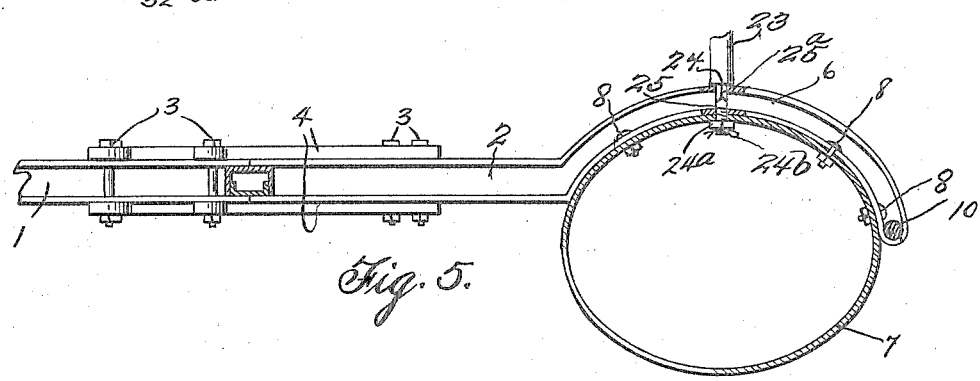
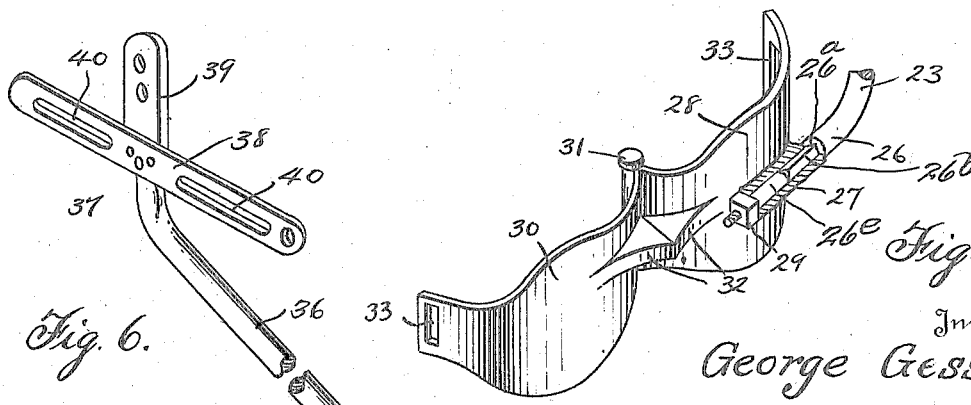
Inventor
George Gessel.
By Watson E. Coleman
Attorney Patented Jan. 9, 1923.

1,441,795

UNITED STATES PATENT OFFICE.

GEORGE GESSEL, OF LOGAN, UTAH.

CARRIER FRAME FOR TIRES, TOOL BOXES, AND LICENSE-NUMBER PLATES.

Application filed July 23, 1921. Serial No. 487,064.

*To all whom it may concern:*

Be it known that I, GEORGE GESSEL, a citizen of the United States, residing at Logan, in the county of Cache and State of Utah, have invented certain new and useful Improvements in Carrier Frames for Tires, Tool Boxes, and License-Number Plates, of which the following is a specification, reference being had to the accompanying drawings.

It is the purpose to provide a device of this kind for automobiles generally, particularly adapted for use in connection with Ford automobiles, on the rear thereof, thereby not only making the Ford automobile appear as a large automobile, but enabling a plurality of tires to be carried, due to the fact that the tool box resembles a gasoline tank, with the license plate to one side, and also mounted on the carrier frame.

A further purpose is to provide a device of this general character which is simple, efficient, and practical in construction, capable of being manufactured for a relatively low cost and sold at a reasonable profit, and also capable of being applied to any style Ford automobile.

A still further purpose is to provide a carrier frame of this character, constituting an extension on the chassis of the Ford automobile, so as to support a plurality of tires, tool box, and a license plate at the rear of the body.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a rear view of a Ford automobile showing the improved carrier frame as applied;

Figure 2 is a plan view of the chassis showing the carrier frame and the tool box applied;

Figure 3 is a side elevation showing the tool box as fastened to the extension carrier frame, and how the carrier frame is attached to the chassis;

Figure 4 is an enlarged detail sectional view through the central portion of the tool box, more clearly showing the bracket 12 and the curved portions 44 and 45 of the cover and the margin of the opening in the tool box;

Figure 5 is an enlarged detail view of one of the arms of the carrier frame, showing the tool box in section and as attached to the curved extensions 6;

Figure 6 is an enlarged detail view of the supporting rod 36 and the bracket 38;

Figure 7 is a detail perspective view of the tire clamping plates 28 and 30; and Figure 8 is a detail sectional view of a portion of one end of the tool box, showing how one of the bracket rods 23 is fastened thereto.

Referring to the drawings, 1 designates the usual chassis of a Ford automobile, and 2 designates arms which are attached to the chassis by means of the bolts 3 and the plates 4. These plates have openings 5 to accommodate the heads of the usual bolts which fasten the side and end pieces of the chassis together. Certain of the bolts 3 pass through ears of the plates 4 and engage upon the side rails of the chassis, thereby holding the plates in position. Other of said bolts 3 pass through the extension arms, thereby holding the arms rigidly in position, substantially as extensions of the side rails of the chassis.

The rear portions 6 of the arms are arcuate in form, to conform to and fit the contour of the tool box 7, which is substantially elliptical, though it may be otherwise shaped. The curved portions 6 of the arms are bolted as at 8 to the wall of the tool box.

The extremities of the arcuate portions 6 have openings 9 for the reception of a rod 10. The ends of the rod 10 are reduced and are engaged through the openings 9, there being nuts 10ª threaded upon the reduced portions, to draw the reduced portions through the openings 9 so as to draw the shoulders 11 of the rod in engagement with the adjacent faces of the arcuate portions 6, thereby holding the rod in place, and to insure rigidity for the carrier frame.

A bracket 12 arcuately formed is bolted at 13 to the central portion of the wall of the tool box. This bracket 12 has a loop 14, through which the rod 10 passes, which not only reinforces the bracket 12, but also reinforces the tool box. This bracket 12 has an arcuate extension plate 15 which conforms to the shape of the tire, and in which a tire rests. This arcuate extension plate 15 is reinforced relatively to the body of the bracket 12 by means of the strengthening rib 16. Hingedly mounted at 17 on the arcuate extension plate 15 is an arcuate clamping plate 18. The clamping plate 18 has a slot 19, for the reception of the looped end of a strap 20, which engages a ring or loop 21 carried by the bracket 12. This strap is provided with the usual buckle, whereby two tires may be strapped in position and in engagement with the arcuate extension plate 15 and clamps 18. A shoulder 22 is formed on the under surface of the arcuate clamps 18, to abut the end of the reinforcing rib of the arcuate plate 15, thereby holding and supporting the clamp 18 in position sufficiently to withstand the weight of a tire.

Bracket rods 23 are provided, and have certain of their ends reduced, thereby causing shoulders 24 to be formed. The reduced portions 25 engage vertically through the arcuate portions 6 of the arms 2, so that the shoulders 24 may engage the upper surfaces of the arcuate portions 6. The nuts 24$^a$ are threaded upon the lower ends of the reduced portions 25, for drawing the shoulders against the upper surfaces of the arcuate portions 6. Cotter pins 24$^b$ are engaged through the lower ends of the reduced portions 25, to prevent the nuts 24$^a$ from unscrewing. Immediately adjacent the shoulders 24 of the bracket rods 23, the reduced portions 25 are rectangular or square in cross section as shown at 25$^a$, and the upper flanges of the portions 6 have correspondingly shaped openings, to receive the square or rectangular parts of the reduced portions 25, to prevent turning of the bracket rods 23. It will be noted that these bracket rods diverge rearwardly and upwardly and terminate in horizontal rearwardly extending portions 26; the extremities of which are reduced, thereby causing shoulders 26$^a$ to be formed. The reduced parts beyond the shoulders 26$^a$ comprise rectangular or square portions and cylindrical portions 26$^b$ and 26$^c$. These portions 26$^b$ and 26$^c$ engage correspondingly shaped bores or interiors of the sleeves 27, which are formed integrally or otherwise on the sides of the tire clamping plates 28, thereby preventing the plates 28 from turning relatively to the reduced portions. The extremities of the portions 26$^e$ have threaded reduced ends, to which nuts 29 are connected, to hold the reduced parts of the portions 26 of the bracket rods 23 in the sleeves 27, hence preventing displacement relatively to the extensions 26. Curved plates or clamps 30 are hingedly connected at 31 to the clamping plates 28, there being abutments 32 on the plates 28 and 30 to limit the plates in position when holding two tires.

The remote ends of the plates 28 and 30 have slots 33 for the reception of straps 34 (which are provided with buckles) for clamping tires in engagement with the plates 28 and 30.

A suitable rod 36 is secured to one of the extremities of the rod 10 by means of one of its nuts, and is in turn connected by means of bolts 37 to a license number plate supporting bracket 38. This bracket 38 has an upwardly protruding extension 39, and is provided with slots 40. Suitable bolts 41 are used to engage through the slots 40 and through the license plate for fastening the same. One end of the bracket 38 receives the end of one of the extensions 26 and is secured thereto by its nut. By this construction the license number plate bracket is supported rigidly in position, and also through the medium of the bracket 38 and the rod which connects to the rod 10, one set of side tire clamps is relatively reinforced to the carrier frame. While the license plate supporting bracket does not entirely support the tire supporting bracket, it does reinforce the bracket rod 23 on the left of the automobile, and also does reinforce the clamping plate 28 on the left of the automobile. In other words the extension 26 of the bracket rod 23 engages through the sleeve 27, and includes one end of the license number plate supporting bracket 28 and by means of its nut 29 the parts are held securely together and reinforced.

The tool box may be constructed of any suitable material, preferably relatively heavy sheet metal and may be any suitable shape, preferably elongated and substantially elliptical in cross section, somewhat resembling the usual gasoline tank carried by large automobiles. The tool box has an opening 43 on its top to permit access to the interior. The margin of this opening is provided with a rolled or curved portion 44, which is engaged by a correspondingly curved portion 45 of a cover 46, which is hinged at 47 to the box. A suitable clasp 48 of a character such as may be purchased from the open market may be applied to the cover and box, so as to hold the cover closed. The clasp may be of a character such as may be locked by a key of the "Yale" type, thereby preventing access to the box.

Projections 49 are carried by the rear part of the box and the cover, and connecting the projections is a tension spring 50, which acts to throw the cover open when it is unlocked, thereby enabling access to the interior of the box.

The invention having been set forth, what is claimed as being new and useful is:

1. In a carrier frame for the purpose indicated, the combination with an automobile chassis, of a pair of extension arms connected to the rear part of the chassis, transverse means connecting the extremities of the arms, said arms adapted to support a container, brackets mounted upon the arms, means mounted upon the brackets and on the connecting means between the arms for supporting tires, and means connecting one of the brackets and one end of the connecting means for supporting a license plate.

2. In a carrier frame for the purpose indicated, the combination with a chassis, of a carrier frame substantially connected to the rear of the chassis and provided with means for supporting a container, means mounted on the carrier frame to support tires, means connected to the carrier frame and to said container to reinforce the lower parts of the tires to hold them rigidly in position, means connecting the carrier frame and one of the first named tire supporting means, to support a license plate.

3. In a carrier frame for the purpose indicated, the combination with the rear part of a chassis, of a carrier frame supported thereon, said carrier frame comprising arms having rear arcuate portions which engage and support a container, a connecting rod connecting the extremities of the arcuate portions of said arms, a bracket mounted upon the connecting rod and connected to the container, said bracket having tire supporting and clamping means to support a pair of tires in position, and means mounted upon the arms of the carrier frame and provided with clamps to support the sides of said tires, means connecting said connecting rod and one of the side clamps for the tires for supporting a license number plate.

4. In a carrier frame for the purpose indicated, the combination with the rear portion of a chassis, of a carrier frame supported thereon, said carrier frame comprising rearwardly extending arms having arcuate rear parts for supporting a container, a connecting rod relatively reinforcing the extremities of the arcuate portions of the arms, a bracket mounted on the connecting rod and connected to the container, said bracket having supporting and clamping means for the lower portions of tires, bracket rods mounted on the arcuate portions of said arms, tire supports and clamps for the sides of the tires mounted on the bracket rods, and means connecting one of the bracket rods and said connecting rod for supporting a license number plate.

In testimony whereof I hereunto affix my signature.

GEORGE GESSEL.